(12) United States Patent
Jun et al.

(10) Patent No.: US 12,003,965 B2
(45) Date of Patent: Jun. 4, 2024

(54) ELECTRONIC DEVICE FOR PROVIDING IOT DEVICE CONTROL SERVICE, AND CONTROL METHOD THEREFOR

(71) Applicant: SAMSUNG ELECTRONICS CO., LTD., Gyeonggi-do (KR)

(72) Inventors: Taesoo Jun, Gyeonggi-do (KR); Saerome Kim, Gyeonggi-do (KR); Jihoon Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 532 days.

(21) Appl. No.: 17/271,453

(22) PCT Filed: Sep. 6, 2019

(86) PCT No.: PCT/KR2019/011546
§ 371 (c)(1),
(2) Date: Feb. 25, 2021

(87) PCT Pub. No.: WO2020/055045
PCT Pub. Date: Mar. 19, 2020

(65) Prior Publication Data
US 2021/0329451 A1  Oct. 21, 2021

(30) Foreign Application Priority Data
Sep. 13, 2018 (KR) .................. 10-2018-0109578

(51) Int. Cl.
*H04W 12/08* (2021.01)
*H04L 41/08* (2022.01)
(Continued)

(52) U.S. Cl.
CPC ......... *H04W 12/08* (2013.01); *H04L 41/0806* (2013.01); *H04L 41/0886* (2013.01); *H04W 12/06* (2013.01)

(58) Field of Classification Search
None
See application file for complete search history.

(56) References Cited

U.S. PATENT DOCUMENTS

| 7,752,655 B2 * | 7/2010 | Ohto ............... H04N 21/835 726/21 |
| 9,032,215 B2 * | 5/2015 | Kalofonos ........... H04L 12/282 726/13 |

(Continued)

FOREIGN PATENT DOCUMENTS

| KR | 1020150115506 | 10/2015 |
| KR | 1020170002969 | 1/2017 |

(Continued)

OTHER PUBLICATIONS

J. -Y. Yu and Y. -G. Kim, "Analysis of IoT Platform Security: A Survey," 2019 International Conference on Platform Technology and Service (PlatCon), Jeju, Korea (South), 2019, pp. 1-5. (Year: 2019).*

(Continued)

*Primary Examiner* — Kari L Schmidt
(74) *Attorney, Agent, or Firm* — The Farrell Law Firm, P.C.

(57) ABSTRACT

An electronic device according to various embodiments of the present invention comprises a communication module, a processor, and a memory which stores a control list for a plurality of devices controllable through a communication network and which is operably connected to the processor, wherein the memory that are configured, when executed, to cause the processor to perform authentication for a first terminal in response to a control authority configuration request for controlling at least one device of the plurality of devices in a first terminal, transmit authentication information about the first terminal to the at least one device of the plurality of devices included in the control list, and configure (Continued)

a control right of the first terminal for the at least one device. In addition, embodiments other than the various embodiments of the present invention are possible.

7 Claims, 10 Drawing Sheets

(51) Int. Cl.
*H04L 41/0806* (2022.01)
*H04W 12/06* (2021.01)

(56) References Cited

U.S. PATENT DOCUMENTS

| | | | |
|---|---|---|---|
| 9,071,967 B1* | 6/2015 | Davies | H04W 12/069 |
| 9,235,943 B2* | 1/2016 | Scalisi | G07C 9/23 |
| 9,396,598 B2* | 7/2016 | Daniel-Wayman | G07C 9/27 |
| 9,913,143 B1 | 3/2018 | Roche et al. | |
| 9,934,635 B2* | 4/2018 | Turner | H04W 4/021 |
| 9,946,857 B2* | 4/2018 | Beals | G06F 21/32 |
| 10,341,320 B2* | 7/2019 | Hanay | H04L 63/10 |
| 10,425,414 B1 | 9/2019 | Buckingham | G06F 21/43 |
| 10,490,003 B2* | 11/2019 | Eyring | G07C 9/38 |
| 10,521,988 B1* | 12/2019 | Allibhoy | G07C 9/00904 |
| 10,637,661 B2* | 4/2020 | Kostiainen | H04L 63/0815 |
| 10,820,203 B2* | 10/2020 | Robinton | H04W 4/80 |
| 11,197,156 B2* | 12/2021 | Cho | H04W 12/50 |
| 2002/0162005 A1* | 10/2002 | Ueda | G06F 21/604 |
| | | | 713/182 |
| 2005/0246531 A1* | 11/2005 | Fabre | H04L 63/0869 |
| | | | 713/168 |
| 2006/0159268 A1 | 7/2006 | Jung et al. | |
| 2007/0039037 A1* | 2/2007 | Son | H04L 41/0883 |
| | | | 340/5.1 |
| 2008/0141347 A1* | 6/2008 | Kostiainen | H04L 9/3226 |
| | | | 726/4 |
| 2008/0313085 A1* | 12/2008 | Kravitz | G06F 21/10 |
| | | | 705/54 |
| 2010/0095356 A1* | 4/2010 | Han | H04L 9/3263 |
| | | | 726/4 |
| 2013/0090952 A1* | 4/2013 | Upadhyayula | G06Q 40/08 |
| | | | 705/4 |
| 2014/0244834 A1* | 8/2014 | Guedalia | H04W 4/08 |
| | | | 709/224 |
| 2014/0250183 A1* | 9/2014 | Unagami | H04M 3/5166 |
| | | | 709/204 |
| 2015/0058936 A1* | 2/2015 | Kang | H04W 12/068 |
| | | | 726/4 |
| 2015/0085848 A1* | 3/2015 | Reunamaki | H04W 48/08 |
| | | | 370/338 |
| 2015/0172925 A1* | 6/2015 | Leppanen | H04W 12/04 |
| | | | 726/7 |
| 2015/0249645 A1* | 9/2015 | Sobel | H04L 63/0815 |
| | | | 726/12 |
| 2015/0288681 A1 | 10/2015 | Park et al. | |
| 2015/0350910 A1* | 12/2015 | Eramian | H04W 12/50 |
| | | | 726/6 |
| 2016/0112429 A1* | 4/2016 | Sundaresan | H04L 63/08 |
| | | | 726/4 |
| 2016/0149908 A1* | 5/2016 | Unagami | H04L 63/065 |
| | | | 713/170 |
| 2016/0255081 A1* | 9/2016 | Liu | H04L 63/0876 |
| | | | 726/4 |
| 2016/0366157 A1 | 12/2016 | Smith et al. | |
| 2017/0004665 A1 | 1/2017 | Chang et al. | |
| 2017/0055150 A1 | 2/2017 | Hou et al. | |
| 2017/0078283 A1* | 3/2017 | Unagami | H04L 9/30 |
| 2017/0126404 A1* | 5/2017 | Unagami | G06F 21/44 |
| 2017/0163943 A1* | 6/2017 | Du | H04N 21/43615 |
| 2017/0185281 A1 | 6/2017 | Park et al. | |
| 2017/0359169 A1* | 12/2017 | Benson | G06F 9/44505 |
| 2018/0005143 A1* | 1/2018 | Camargo | H04W 12/06 |
| 2018/0061158 A1* | 3/2018 | Greene | G06V 20/52 |
| 2018/0160252 A1 | 6/2018 | Olive et al. | |
| 2018/0183788 A1 | 6/2018 | Kim et al. | |
| 2020/0059787 A1* | 2/2020 | Whitaker | H04L 63/0807 |
| 2020/0169549 A1* | 5/2020 | Smith | H04L 63/101 |
| 2021/0344483 A1* | 11/2021 | Zeigler | H04L 9/085 |

FOREIGN PATENT DOCUMENTS

| | | | |
|---|---|---|---|
| KR | 1020170055264 | 5/2017 | |
| KR | 101747927 | 6/2017 | |
| KR | 1020170078106 | 7/2017 | |
| KR | 1020180073044 | 7/2018 | |
| WO | WO-2016178636 A1 * | 11/2016 | G06F 1/3231 |

OTHER PUBLICATIONS

J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913. (Year: 2018).*
Yousefnezhad, Narges, et al. "Authentication and access control for open messaging interface standard." Proceedings of the 14th EAI International Conference on Mobile and Ubiquitous Systems: Computing, Networking and Services. 2017, pp. 20-27. (Year: 2017).*
PCT/ISA/210 Search Report issued on PCT/KR2019/011546, dated Dec. 13, 2019, pp. 5.
PCT/ISA/237 Written Opinion issued on PCT/KR2019/011546, dated Dec. 13, 2019, pp. 6.
Korean Office Action dated May 10, 2023 issued in counterpart application No. 10-2018-0109578, 15 pages.
Korean Office Action dated Oct. 30, 2023 issued in counterpart application No. 10-2018-0109578, 9 pages.

* cited by examiner

ELECTRONIC DEVICE FOR PROVIDING IOT DEVICE CONTROL SERVICE, AND CONTROL METHOD THEREFOR

PRIORITY

This application is a National Phase Entry of PCT International Application No. PCT/KR2019/011546, which was filed on Sep. 6, 2019, and claims priority to Korean Patent Application No. 10-2018-0109578, which was filed on Sep. 13, 2018, the contents of each of which are incorporated herein by reference.

TECHNICAL FIELD

Various embodiments of the present disclosure relate to a method for providing an Internet of Things (IoT) device control service to a plurality of electronic devices.

BACKGROUND ART

With the rapid spread of portable electronic devices such as smart phones or tablet computers, services and additional functions provided through electronic devices have been gradually sophisticated. Communication service providers or electronic device manufacturers have exerted much effort on mounting various components on electronic devices and developing related techniques to raise effective value of an electronic device and satisfy demands of various users.

Recently, attention has been increasingly paid to Internet of Things (IoT) technology which connects things in the real world over a network, and collects situation information from the things and controls a surrounding environment by using a portable electronic device. The IoT technology is applicable to various environments such as vehicles, offices, or factories as well as home, and allows a user to collect environment information from a plurality of things and analyze the collected information to control devices.

DETAILED DESCRIPTION OF THE INVENTION

Technical Problem

To control IoT devices by using a portable electronic device, a user needs a control authority over devices operating in a particular environment. For example, in an environment of a smart home, an authority of family members to control devices of the smart home may be set by registering a user account of each family member in an infrastructure that manages the devices of the smart home. The devices of the smart home belong to the user having a control authority, and a new user may be set with a control authority by a user serving as a master in the smart home to control the devices of the smart home. For a non-family member, e.g., a visitor staying for a specific time in the smart home, a control authority for the devices of the smart home may be temporarily given, and when the visitor has no need to use the devices of the smart home, the control authority of the visitor has to be withdrawn. To withdraw the control authority of the visitor, configuration change for a visitor's account is required, which is possible with an access authority for the infrastructure of the smart home. Even when a function of Open Connectivity Foundation (OCF) specifications, which are standards applied broadly to the field of IoT technology, the visitor has to initialize a target device for which a control authority is to be obtained or obtain the control authority by using a multiple ownership transfer scheme. In this case, there is a limitation in a sense that an initialization process for setting a control authority of the visitor with respect to each of a plurality of target devices is required and a control authority of an existing user may be cancelled due to initialization of the target device.

Various embodiments of the present disclosure provide an electronic device and a control method thereof in which a user having a control authority over a plurality of devices may temporarily give a control authority to or withdraw the control authority from a visitor without using an external infrastructure.

Technical Solution

An electronic device according to various embodiments of the present disclosure includes a communication module, a processor, and a memory storing a control list of a plurality of devices controllable through a communication network and operatively connected with the processor, in which the memory stores instructions that are configured, when executed, to cause the processor to perform authentication with respect to a first terminal in response to a control authority setting request for controlling at least one of the plurality of devices from the first terminal, transmit credential information for the first terminal to at least one of the plurality of devices included in the control list, and set a control authority of the first terminal for the at least one device.

An electronic device according to various embodiments of the present disclosure includes a communication module, a processor, and a memory operatively connected to the processor, in which the memory stores instructions that are configured, when executed, to cause the processor to receive invitation information including at least one of a control list or a first shared key for a plurality of devices from a user terminal having a control authority over the plurality of devices, transmit credential information generated based on the invitation information to the user terminal, and control at least one of the plurality of devices by using the credential information.

A method for providing a device control service by an electronic device that manages a control list for a plurality of devices controllable through a communication network, according to various embodiments of the present disclosure includes performing authentication with respect to a first terminal in response to a control authority setting request for controlling at least one of the plurality of devices from the first terminal, transmitting credential information for the first terminal to at least one of the plurality of devices included in the control list, and setting a control authority of the first terminal over the at least one device.

Advantageous Effects

An electronic method and a method according to various embodiments may give an authority to temporarily control a device to a visitor and withdraw the control authority given to the visitor by using functions of OCF specifications without passing through a cloud infrastructure. To give or withdraw the control authority over target devices, the target devices may be collectively processed through an existing user terminal without being separately initialized, and a device control authority may be managed safely and efficiently in providing an IoT device control service.

BRIEF DESCRIPTION OF DRAWINGS

The above and other aspects, features and advantages of certain exemplary embodiments of the present disclosure will be more apparent from the following description taken in conjunction with the accompanying drawings, in which.

MODE FOR CARRYING OUT THE INVENTION

Figure 1:
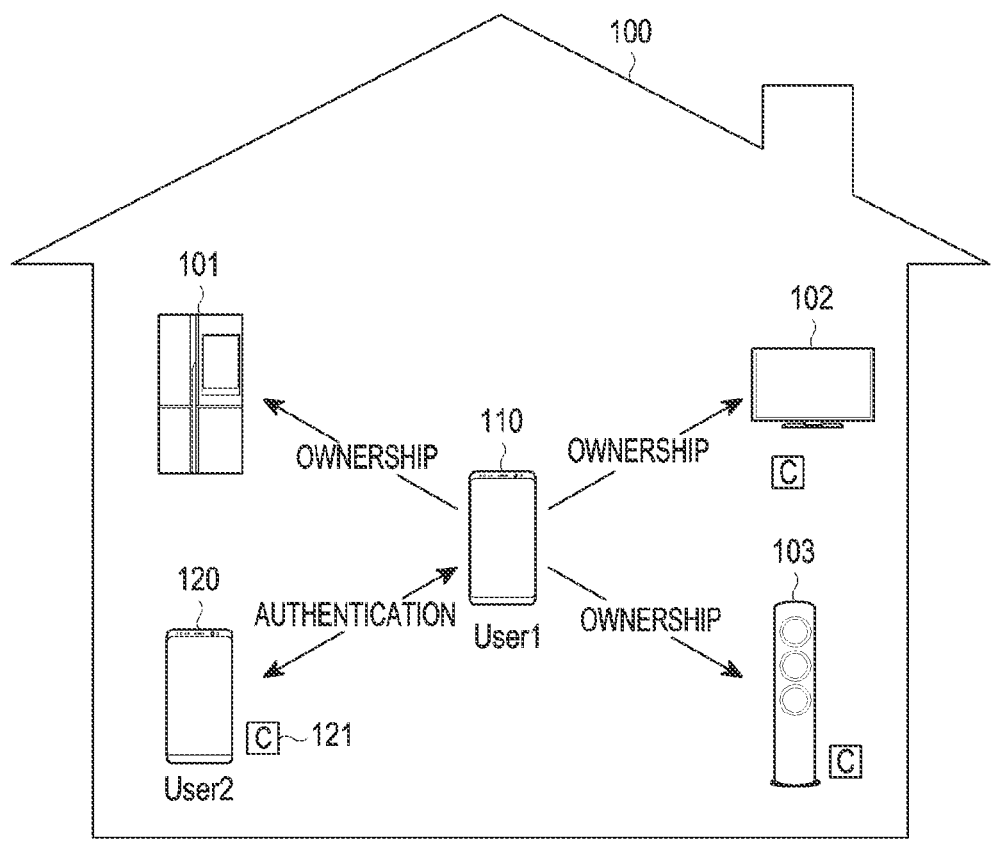
FIG. 1 is a view showing a scheme in which a plurality of electronic devices control devices installed in a smart home, according to various embodiments of the present disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

An expression "configured (or set) to" used in the present disclosure may be replaced with, for example, "suitable for," "having the capacity to," "designed to," "adapted to," "made to," or "capable of" according to a situation. A term "configured (or set) to" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Each of the foregoing elements described in various embodiments of the present disclosure may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Terms defined in the present disclosure are used for only describing a specific exemplary embodiment and may not have an intention to limit the scope of other exemplary embodiments. It is to be understood that a singular form of a noun corresponding to an item may include one or more of the things, unless the relevant context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the disclosure may include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, mobile medical equipment, a camera, or a wearable device (e.g., smart glasses, a head-mounted-device (HMD), electronic clothes, an electronic bracelet, an electronic necklace, an electronic appcessory, electronic tattoos, a smart mirror, or a smart watch).

According to some embodiments of the disclosure, the electronic device may be a smart home appliance. The smart home appliance may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic frame.

According to another embodiment of the disclosure, the electronic device may include at least one of various medical equipment (e.g., various portable medical measurement systems (a blood sugar measurement device, a heartbeat measurement device, a blood pressure measurement device, or a body temperature measurement device), a magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of Things (IoT) devices (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments of the disclosure, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

FIG. 1 is a view showing a scheme in which a plurality of electronic devices control devices installed in a smart home 100, according to various embodiments of the present disclosure. In the smart home 100 shown in FIG. 1, a plurality of devices used in a specific space such as a refrigerator 101, a television (TV) 102, or an airconditioner 103, and the plurality of devices may include a device-to-device (D2D) communication function using a wireless network. In the smart home 100, a first user terminal 110 to be provided with an Internet of Things (IoT) control service may set an ownership for the plurality of devices through an on-boarding tool (OBT) and obtain a control authority by owning the plurality of devices. The first user terminal 110 having obtained the control authority over devices in the smart home 100 may set an ownership using a multiple ownership transfer scheme to control the plurality of devices for other users. The first terminal 110 having owned the plurality of devices through the OBT like the user may be referred to as an owner, and a second user terminal 120 having been set with an ownership for the plurality of devices through the multiple ownership transfer scheme may be referred to as a sub owner. According to various embodiments of the present disclosure, a user having a master authority in the smart home 100 may be set as the first user terminal 110 or multiple members residing in the smart home 100 may be set as the plurality of first user terminals 110. For example, a user initially registering a user account through the OBT may set the first user terminal 110, and the second user terminals 120 having been set with ownerships for the devices through the first user terminal 110 may obtain a qualification as sub owners. When the multiple members are set as the first user terminal 110, the plurality of first user terminals 110 may equally have ownerships for devices, and temporarily set the second user terminals 120 requiring a control authority with respect to devices in the smart home 100 as sub owners. The second user terminal 120 being set as the sub owner obtains a control authority over the devices in the smart home 100 in the same manner as the first user terminal 110, but an authority to be exercised thereby may be limited in that the second user terminal 120 may not be able to change ownerships of other users, unlike the first user terminal 110.

In FIG. 1, to give a control authority over the plurality of devices 101, 102, and 103 to the second user terminal 120 within a limited time, the first user terminal 110 having owned the plurality of devices 101, 102, and 103 installed in the smart home 100 may change an ownership state of at least one of the plurality of devices 101, 102, and 103. For example, the first user terminal 110 may determine at least one device capable of sharing a control authority among the plurality of devices 101, 102, and 103, and set an ownership state of the at least one device to a control authority sharing possible state. The first user terminal 110 may set a sharing key to authenticate the second user terminal 120 and deliver the set shared key to the at least one device. According to various embodiments of the present disclosure, the ownership states or shared key of the plurality of devices may be set by default, and in this case, the first user terminal 110 may authenticate the second user terminal 120 to set the control authority therefor without changing the ownership states or setting the shared key for the plurality of devices.

The first user terminal 110 may transmit invitation information to the second user terminal 120 to authenticate the second user terminal 120. The invitation information may include at least one of a control list for the plurality of devices or the shared key delivered by the first user terminal 110 to the at least one device. The second user terminal 120 may generate credential information 121 based on the invitation information, upon receiving the invitation information from the first user terminal 110. For example, the second user terminal 120 may generate the credential information 121 by combining at least one of identification information of the second user terminal 120, a list of target devices, or a target device list, over which a control authority is to be obtained, the shared key, or an authentication certificate, and transmit the generated credential information 121 to the first user terminal 110. The second user terminal 120 may include, in the target device list, all or some of the plurality of devices for which sharing of a control authority is permitted by the first user terminal 110. According to various embodiments of the present disclosure, in the control list, for a device over which sharing of a control authority is not permitted by the first user terminal 100, the second user terminal 120 may obtain the control authority through ha separate control authority setting request.

Upon completion of authentication with respect to the second user terminal 120, the first user terminal 110 may deliver the credential information 121 received from the second user terminal 120 to at least one device included in the target device list. When the TV 102 and the airconditioner 103 among the plurality of devices 101, 102, and 103 installed in the smart home 100 are included in the target device list, the first user terminal 110 may deliver the credential information 121 of the second user terminal 120 to the airconditioner 103. The second user terminal 120 may be able to control the TV 102 or the airconditioner 103 by communicating with the TV 102 or the airconditioner 103 by using a symmetric key generated based on the credential information 121 of the second user terminal 120, and may not be able to control the refrigerator 101 having no credential information 121.

When the first user terminal 110 desires to withdraw a control authority over the TV 102 or the airconditioner 103 given to the second user terminal 120, the first user terminal 110 may discard the credential information 121 of the second user terminal 120 and notify the TV 102 or the airconditioner 103 of discard of the credential information 121. After the credential information 121 is discarded, control authority setting with respect to the TV 102 or the airconditioner 103 of the second user terminal 120 may be released such that the second user terminal 120 may not be able to control the TV 102 or the airconditioner 103 any longer.

According to various embodiments of the present disclosure, the first user terminal 110 may set a valid time for the credential information 121 before or after transmitting the credential information 121 of the second user terminal 120 to the TV 102 or the airconditioner 103. The first user terminal 110 may automatically discard the credential information 121 after an elapse of the valid time and notify the devices of the discard of the credential information 121. Even before the elapse of the valid time, the first user terminal 110 may detect leaving of the second user terminal 120 from the smart home 100 or determine no need to control the devices in the smart home 100, the first user terminal 110 may discard the credential information 121 to withdraw the device control authority of the second user terminal 120.

Figure 2:
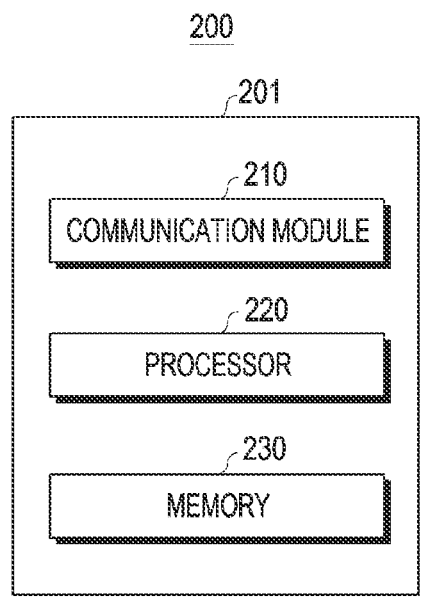
FIG. 2 is a block diagram of an electronic device that manages a control authority over a plurality of devices, according to various embodiments of the present disclosure.

FIG. 2 is a block diagram 200 of an electronic device 201 that manages a control authority over a plurality of devices, according to various embodiments of the present disclosure. Referring to FIG. 2, the electronic device 201 may be a device (e.g., a smart phone or a tablet computer) that gives a control authority over a plurality of devices controllable through a communication network to another user and withdraws a control authority given to another user, and may correspond to the first user terminal 110 of FIG. 1. The electronic device 201 may include a communication module 210, a processor 220, or a memory 230.

According to various embodiments of the present disclosure, the memory 230 may store a control list with respect to the plurality of devices. The control list may include, as information about a plurality of devices which the electronic device 201 owns and for which the electronic device 201 has a control authority, at least one of item-specific device identification information, device type information, control authority setting state information, or security level information of the plurality of devices.

The memory 230 may store instructions for, when executed, controlling the processor 220 to perform various operations. For example, upon receiving a control authority setting request for controlling at least one of the plurality of devices from a first terminal (e.g., the second user terminal 120 of FIG. 1), the processor 220 may perform authentication with respect to the first terminal. To set a control authority of the first terminal with respect to the at least one device, the processor 220 may set an ownership state of the at least one device to a control authority owning possible state, generate a first shared key to be used for authentication of the first terminal, and transmit the first shared key to the at least one device. The at least one device for which control authority sharing is permitted among the plurality of devices owned by the electronic device 201 may be previously designated or may be selected by user's setting during authentication with respect to the first terminal.

The processor 220 may invite the first terminal and initiate authentication with respect to the first terminal. For example, the processor 220 may transmit invitation information including at least one of the control list or the first shared key by using the communication module 210, and receive credential information of the first terminal generated based on the invitation information from the first terminal. The credential information may include at least one of identification information of the first terminal, a list of at least one target device over which the first terminal is to be set with the control authority, the first shared key, or the authentication certificate. The target device list may include all or some of at least one device set to the control authority sharing possible state in the control list. During authentication with respect to the first terminal, the electronic device 201 may communicate with the first terminal by using an out-of-band scheme.

Upon completion of authentication with respect to the first terminal, the processor 220 may transmit the credential information of the first terminal to at least one device (e.g., the plurality of devices 101, 102, and 103 of FIG. 1) included in the target device list, through the communication module 210. During transmission of the credential information of the first terminal to the at least one device, the processor 220 may set a valid time for the credential information to cause the first terminal to temporarily obtain the control authority over the at least one device. When the valid time for the credential information has elapsed, the processor 220 may withdraw the control authority of the first terminal with respect to the at least one device by notifying the at least one device of discard of the credential information.

According to various embodiments of the present disclosure, the electronic device 201 may further include a sensor module for detecting at least one position of the plurality of devices or the first terminal. The processor 220 may determine by using the sensor module whether the first terminal is located within a designated distance from the electronic device 201 or the at least one device. When determining that the first terminal is not within the designated distance, the processor 220 may discard the credential information even when the valid time for the credential information of the first terminal has not elapsed, and notify the at least one terminal of discard of the credential information, thereby withdrawing the control authority over the at least one device, obtained by the first terminal.

The processor 220 may set the control authority of the first terminal with respect to the at least one device, based on the credential information. The processor 220 may cause the first terminal and the at least one device to communicate with each other by using the credential information, and manage the at least one device over which the first terminal has obtained the control authority as a first group. The processor 220 may add or exclude a device managed by the first group to correspond to situation information change related to the first group (e.g., reception of a request from the first terminal, position change of the first terminal or the at least one device, or detection of an enabled/disabled state of the at least one device), and change control authority setting of the first terminal.

The electronic device 201 according to various embodiments of the present disclosure includes the communication module 210, the processor 220, and the memory 230 storing a control list of a plurality of devices controllable through a communication network and operatively connected with the processor 220, in which the memory 230 stores instructions that are configured, when executed, to cause the processor to perform authentication with respect to a first terminal in response to a control authority setting request for controlling at least one of the plurality of devices from the first terminal, transmit credential information for the first terminal to at least one of the plurality of devices included in the control list, and set a control authority of the first terminal for the at least one device.

According to various embodiments of the present disclosure, the instructions are configured to cause the processor 220 to set at least one of the plurality of devices included in the control list to a control authority sharing possible state and transmit a first shared key for authentication to the at least one device through the communication module 210.

According to various embodiments of the present disclosure, the instructions are configured to cause the processor 220 to transmit invitation information including at least one of the control list or the first shared key to the first terminal, by using the communication module 210 and receiving the credential information generated based on the invitation information from the first terminal, by using the communication module 210.

According to various embodiments of the present disclosure, the control list includes at least one of item-specific device identification information, device type information, control authority setting information, or security level information of the plurality of devices.

According to various embodiments of the present disclosure, the credential information includes at least one of identification information of the first terminal, a list of devices over which the first terminal is to share a control authority, the first shared key, or an authentication certificate.

According to various embodiments of the present disclosure, the instructions are configured to cause the processor 220 to perform authentication with respect to the first terminal by using an out-of-band scheme.

According to various embodiments of the present disclosure, the instructions are configured to cause the processor 220 to set a valid time for the credential information of the first terminal and release control authority setting of the first terminal for the at least one device upon elapse of the valid time.

According to various embodiments of the present disclosure, the electronic device 201 further includes a sensor module configured to detect a position of at least one of the plurality of devices or the first terminal, in which the instructions are configured to cause the processor 220 to discard the credential information of the first terminal when determining that the first terminal is not within the designated distance by using the sensor module and notify to the at least one device that the credential information of the first terminal is discarded.

Figure 3:
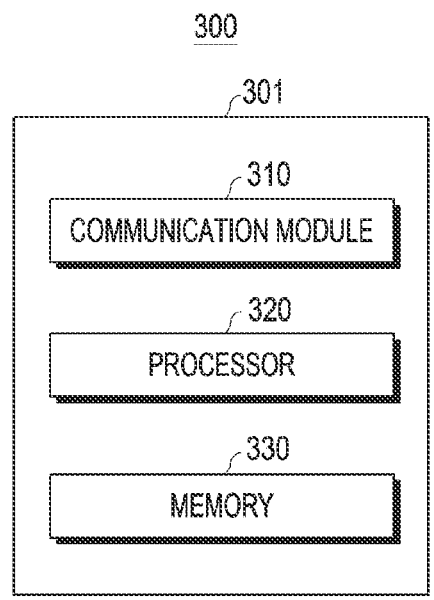
FIG. 3 is a block diagram of an electronic device that temporarily obtains a control authority over a plurality of devices, according to various embodiments of the present disclosure.

FIG. 3 is a block diagram 300 of an electronic device 301 that temporarily obtains a control authority over a plurality of devices, according to various embodiments of the present disclosure. Referring to FIG. 3, the electronic device 301 may be a device (e.g., a smart phone or a tablet computer) that obtains a control authority for a plurality of devices controllable through a communication network from a user terminal (e.g., the first user terminal 110 of FIG. 1 or the electronic device 201 of FIG. 2) having the control authority. The electronic device 301 may include a communication module 310, a processor 320, or a memory 330.

The memory 330 may store instructions for, when executed, controlling the processor 320 to perform various operations. For example, the processor 320 may request authentication for obtaining a control authority for at least one of the plurality of devices from the user terminal. The processor 320 may receive invitation information including at least one of a control list or a first shared key for the plurality of devices from the user terminal, by using the communication module 310. The control list may include, as information about a plurality of devices which the electronic device 201 owns and for which the user terminal has a control authority, at least one of item-specific device identification information, device type information, control authority setting state information, or security level information of the plurality of devices.

The processor 320 may transmit the credential information generated based on the invitation information received from the user terminal to the user terminal through the communication module 310. The credential information may be generated by using at least one of identification information of the electronic device 301, information about at least one target device over which the electronic device 301 is to obtain the control authority, the first shared key, or the authentication certificate. The at least one target device may correspond to all or some of at least one device set to the control authority sharing possible state in the control list. According to various embodiments of the present disclosure, the electronic device 301 may identify a device having an ownership state set to the control authority sharing possible state among a plurality of devices included in the control list, and select all or some of the devices set to the control authority sharing possible state, as at least one target device over which the control authority is to be obtained from the user terminal. The electronic device 301 may exchange the invitation information or the credential information with the user terminal by using the out-of-band scheme.

Upon completion of authentication between the electronic device 301 and the user terminal, the credential information may be delivered to the at least one target device by the user terminal. When the control authority of the electronic devote 301 with respect to the at least one target device is set by the user terminal, the processor 302 may control the at least one target device by using the credential information. For example, the processor 320 may generate a symmetric key for communication with the at least one target device based on the credential information, and control the at least one target device by using the generated symmetric key. The at least one target device may be managed as the first group, and upon occurrence of situation information change (e.g., requesting by the electronic device 301, position change of the electronic device 301 or the at least one device, or detection of an enabled/disabled state of the at least one device), control authority setting of the electronic device 301 may be changed by the user terminal. When the credential information is deleted by the user terminal or the credential information is discarded due to an elapse of a valid time set in the credential information, the control authority of the electronic device 301 with respect to the at least one device may be deleted, such that the electronic device 301 may not be able to control the at least one device any longer.

The electronic device 301 according to various embodiments of the present disclosure includes the communication module 310, the processor 320, and the memory 330 operatively connected to the processor, in which the memory stores instructions that are configured, when executed, to cause the processor 320 to receive invitation information including at least one of a control list or a first shared key for a plurality of devices from a user terminal having a control authority for the plurality of devices, transmit credential information generated based on the invitation information to the user terminal, and control at least one of the plurality of devices by using the credential information.

According to various embodiments of the present disclosure, the instructions are configured to cause the processor 320 to select, as a first group, at least one device over which a control authority is to be obtained from among the plurality of devices included in the control list.

According to various embodiments of the present disclosure, the instructions are configured to cause the processor 320 to generate the credential information based on at least one of identification information, information about the first group, the first shared key, or an authentication certificate.

According to various embodiments of the present disclosure, the instructions are configured to cause the processor 320 to generate a symmetric key for communication with the at least one device based on the credential information and control the at least one device by using the generated symmetric key.

Figure 4:
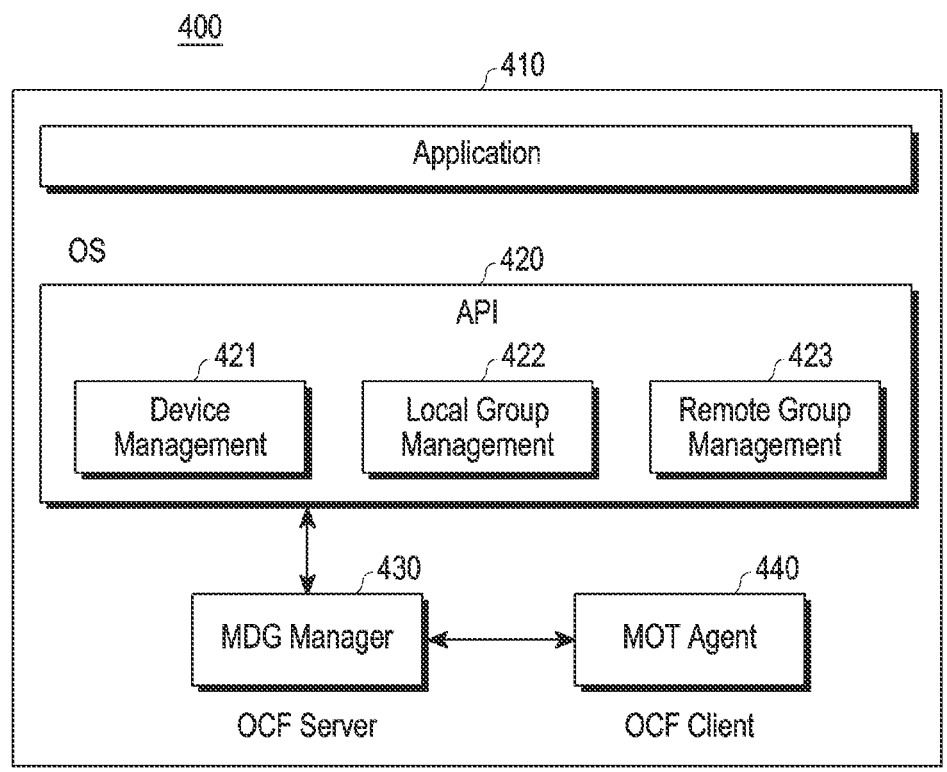
FIG. 4 is a diagram showing a structure of a software (SW) system installed in an electronic device, according to various embodiments of the present disclosure.

FIG. 4 is a diagram 400 showing a structure of a software (SW) system 410 installed in the electronic devices 201 and 301, according to various embodiments of the present disclosure. In the electronic device 201 of FIG. 2 or the electronic device 301 of FIG. 3, the SW system 410 based on OCF standards may be established for an IoT device control service. The SW system 410 may allow the electronic devices 201 and 301 to access a plurality of devices, own and control the plurality of devices.

The SW system 410 established in the electronic devices 201 and 301 may include a an application programming interface (API) 420 based on an operating system (OS) such as Tizen or Android, a management development group (MDG) manager 430 operating as an OCF server, and a multiple ownership transfer (MOT) agent 440 operating as an OCF client.

The API 420 of the SW system 410 may include a device management module 421, a local group management module 422, and a remote group management module 423. The device management module 421 may search for an OCF device existing in a surrounding environment or a network, invite the found OCF device, and transmit and receive security data between pairwise managers. The pairwise operation may be an operation of setting an access control list or credential information for security communication between OCF resources owned by the electronic device 201 or 301. The local group management module 422 may generate or delete a virtual group and add or delete an OCF device to a group being managed. The group may be a set of devices owned by the electronic device 201 or 301. The local group management module 422 may perform a function of searching for other groups existing in the surrounding environment or the network. The remote group management module 423 may perform a function in which a device owned using an MOT method generates a group and requests owning of another device in an MOT possible state (in the control authority sharing possible state) or deletes owned group or MOT related information.

The MDG manager 430 may be a module exchanging security data with a device added to a group, and may be used in a process of transferring a control authority with respect to a currently owned device to the electronic device 301 to share the control authority. The electronic device 201 and the electronic device 301 may share the control authority through the pairwise operation between two MDG managers, and to this end, the MDG manager 430 may store at least one of device information, a group list, or a list of devices included in the group in a database and manage them. The MOT agent 440 may be a module performing a security-related control operation of the OCF, and may support the pairwise operation between the MDG manager of the electronic device 201 and the MDG manager of the electronic device 301. Through the pairwise operation, an access control list and credential information between the electronic device 201 and the electronic device 301 may be added to the database of the MDG manager 430, in which the pairwise operation may be performed when MOT is possible or an ownership is set between the two MDG managers. The two pairwise MDG managers may securely transmit and receive data by using a symmetric key included in the credential information for a resource configured in the access control list.

Figure 5A:
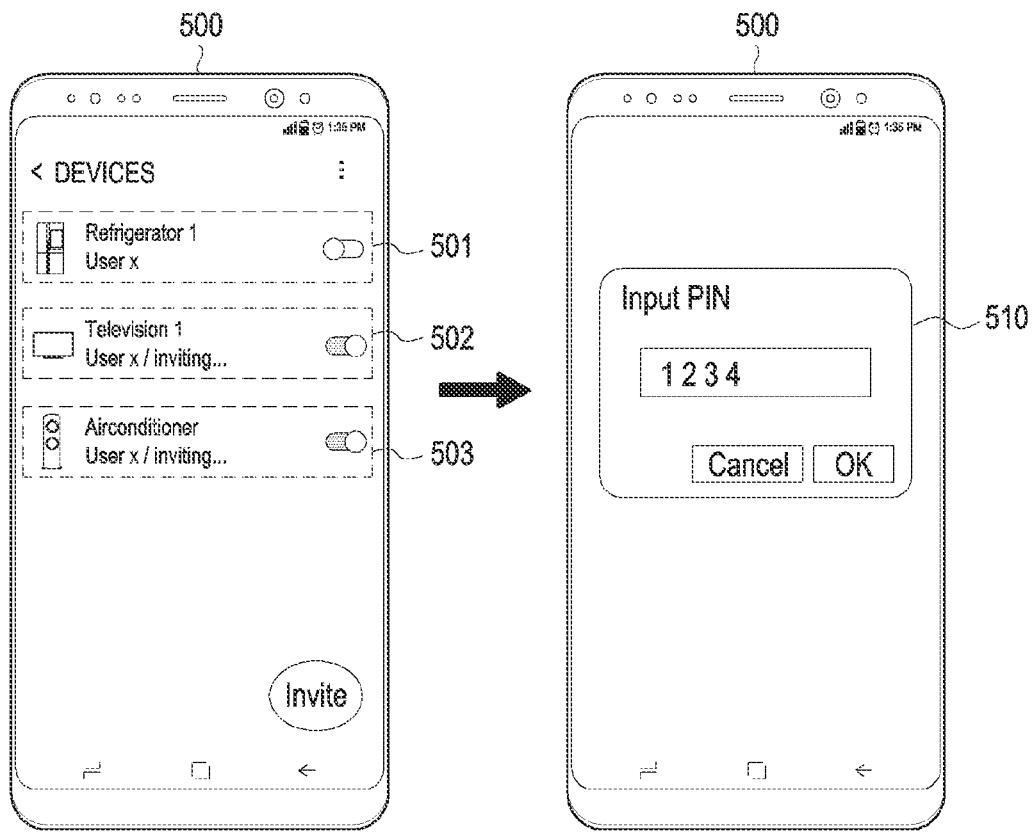
FIGS. 5A, 5B, and 5C illustrate a process of performing authentication between a user terminal and a visitor terminal, according to various embodiments of the present disclosure.
Figure 5B:
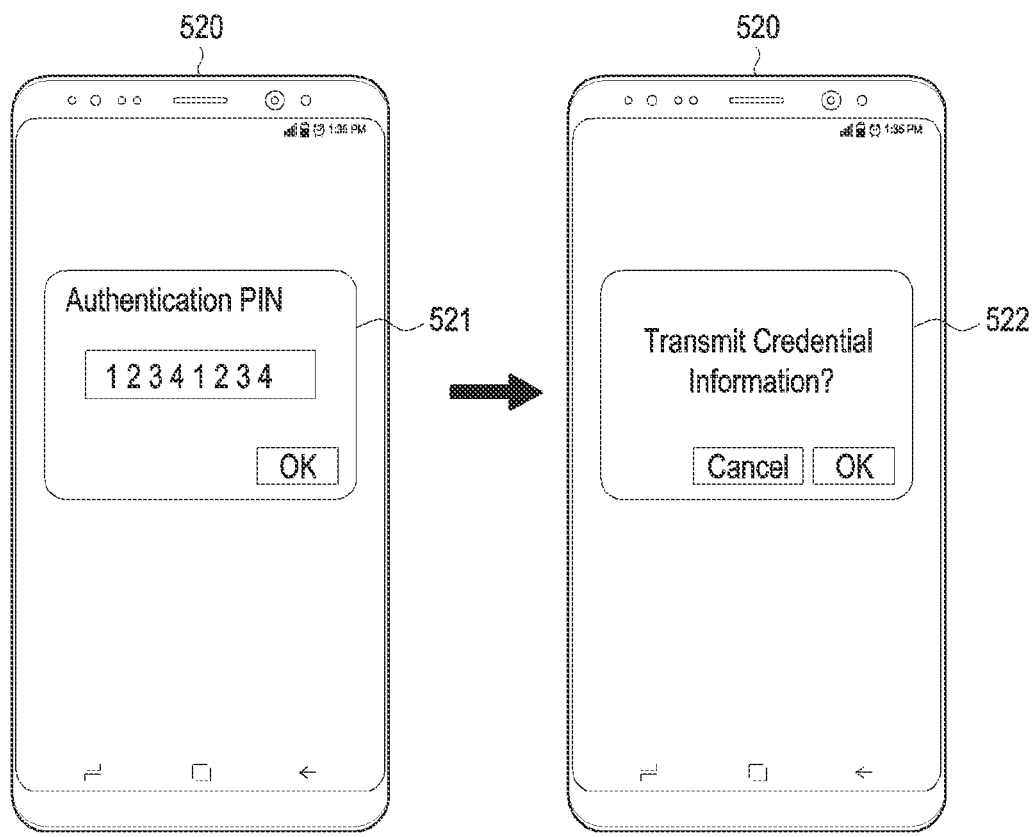
Figure 5C:
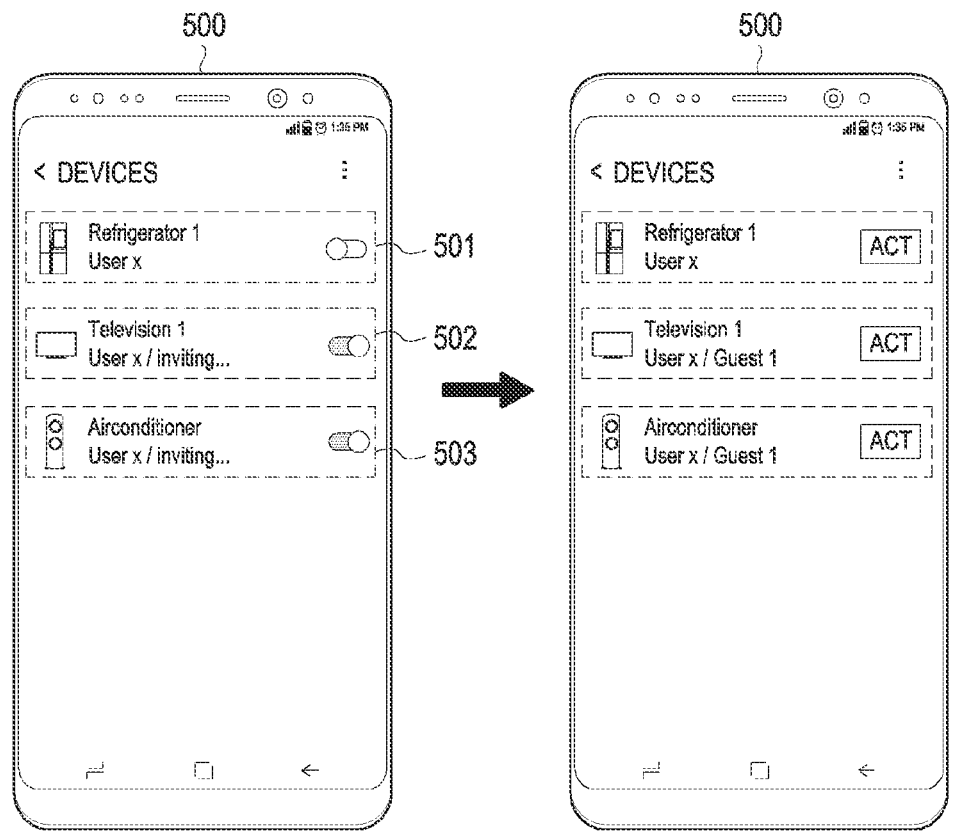

FIGS. 5A, 5B, and 5C illustrate a process of performing authentication between a user terminal and a visitor terminal, according to various embodiments of the present disclosure. FIG. 5A illustrates a scheme in which a user terminal 500 invites a visitor terminal 520, and FIG. 5B illustrates a scheme in which the visitor terminal 520 invited by the user terminal 500 transmits credential information. FIG. 5C illustrates a scheme in which the user terminal 500 manages a plurality of devices owned. The user terminal 500 may correspond to the first user terminal 110 of FIG. 1 or the electronic device 201 of FIG. 2, and the visitor terminal 520 may correspond to the second user terminal 120 of FIG. 1 or the electronic device 301 of FIG. 3.

In FIG. 5A, the user terminal 500 may manage ownership setting for the plurality of devices owned. Before giving the control authority with respect to the plurality of devices to the visitor terminal 520, the user terminal 500 may determine at least one device that may be able to share the control authority with another user among the plurality of devices. For example, the user terminal 500 may configure that control authority sharing is impossible for the refrigerator 501 among the plurality of devices owned thereby and that control authority sharing is possible for the TV 502 and the air-conditioner 503. Whether sharing of a control authority over each device is possible may be manually set by the user or may be automatically set according to a security level or position of each device. After whether sharing of a control authority is possible over each of the plurality of devices is set through the user terminal 500, upon selection of an invitation button, the user terminal 500 may display a personal identification number (PIN) input window 510 and receive a shared key for authentication of the visitor terminal 520. When PIN number input in the user terminal 500 is completed, the user terminal 500 may transmit the input PIN number to at least one device set to the control authority sharing possible state. The PIN may be used to authenticate the visitor terminal 520, and after completion of authentication, the visitor terminal 520 may be used to control the at least one device.

After transmission of the PIN input from the user terminal 500 to the at least one device, authentication with respect to the visitor terminal 520 may be performed. The user terminal 500 may invite the visitor terminal 520 by transmitting the PIN transmitted to the at least one device to the visitor terminal 520. The invitation may mean start of a procedure in which the user terminal 500 gives a control authority over at least one device to the visitor terminal 520 or the visitor terminal 520 is bound to the user terminal 500. In response to invitation of the visitor terminal 520 by the user terminal 500, the visitor terminal 520 may receive and display the PIN 521 as shown in FIG. 5B. The visitor terminal 520 may receive a control list for the plurality of devices owned by the user terminal 500, together with the PIN. The control list may include at least one of device identification information, device type information, control authority setting state information, or security level information of each of the plurality of devices. The visitor terminal 520 may generate credential information by using at least one of an credential PIN 521 received from the user terminal 500, an authentication certificate of the visitor terminal 520, identification information, or a list of target devices for which the control authority is to be obtained. The target device list of the target devices for which the control authority is to be obtained may include all or some of at least one devices for which control authority sharing is permitted by the user terminal 500 in FIG. 5A. When the credential information is generated, the visitor terminal 520 may determine whether to transmit the generated credential information to the user terminal 500 through a credential information transmission determination message 522. By transmitting the credential information received from the visitor terminal 520 to a device included in the target device list, the user terminal 500 may enable communication between the visitor terminal 520 and a target device to be performed securely. For example, when the visitor terminal 520 selects as the target devices, both a TV and an airconditioner which are set to the control authority sharing possible state by the user terminal 510, the user terminal 510 may transmit credential information of the visitor terminal 520 to both the TV and the airconditioner. When the visitor terminal 520 selects, as the target device, the TV from among devices which are set to the control authority sharing possible state, the user terminal 510 may transmit the credential information of the visitor terminal 520 to the TV without transmitting the credential information to the airconditioner.

FIG. 5C illustrates a scheme in which the user terminal 500 manages a plurality of devices owned. When authentication is completed between the user terminal 500 and the visitor terminal 520 shown in FIGS. 5A and 5B, the user terminal 500 may manage an ownership state and an operation state for each of the plurality of devices through a device state setting page. The control authority over the refrigerator 501 among the plurality of devices owned by the user terminal 500 is owned by the user terminal 500, such that the ownership state of the refrigerator 501 may be indicated by 'User x' indicating the user terminal 500. A control authority over the TV 502 and the airconditioner 503 may be owned by the user terminal 500 and the visitor terminal 520, such that the ownership states of the TV 502 and the airconditioner 503 may be indicated by both 'User x' indicating the user terminal 500 and 'Guest 1' indicating the visitor terminal 520. All of the plurality of devices operate normally, such that all the operation states may be indicated by 'ACT'. According to various embodiments of the present disclosure, the device state setting page managed by the user terminal 500 may be configured based on a group generated for each visitor terminal 520 and is not limited by any one embodiment.

When situation information change (e.g., reception of a request of the visitor terminal 520, movement of the visitor terminal 520, position change of at least one of the plurality of devices, or detection of an enabled/disabled state of the at least one device) related to the plurality of devices owned by the user terminal 500 occurs, setting for the at least one device may be changed or control authority setting for the visitor terminal 520 may be changed through the device state setting page.

Figure 6:
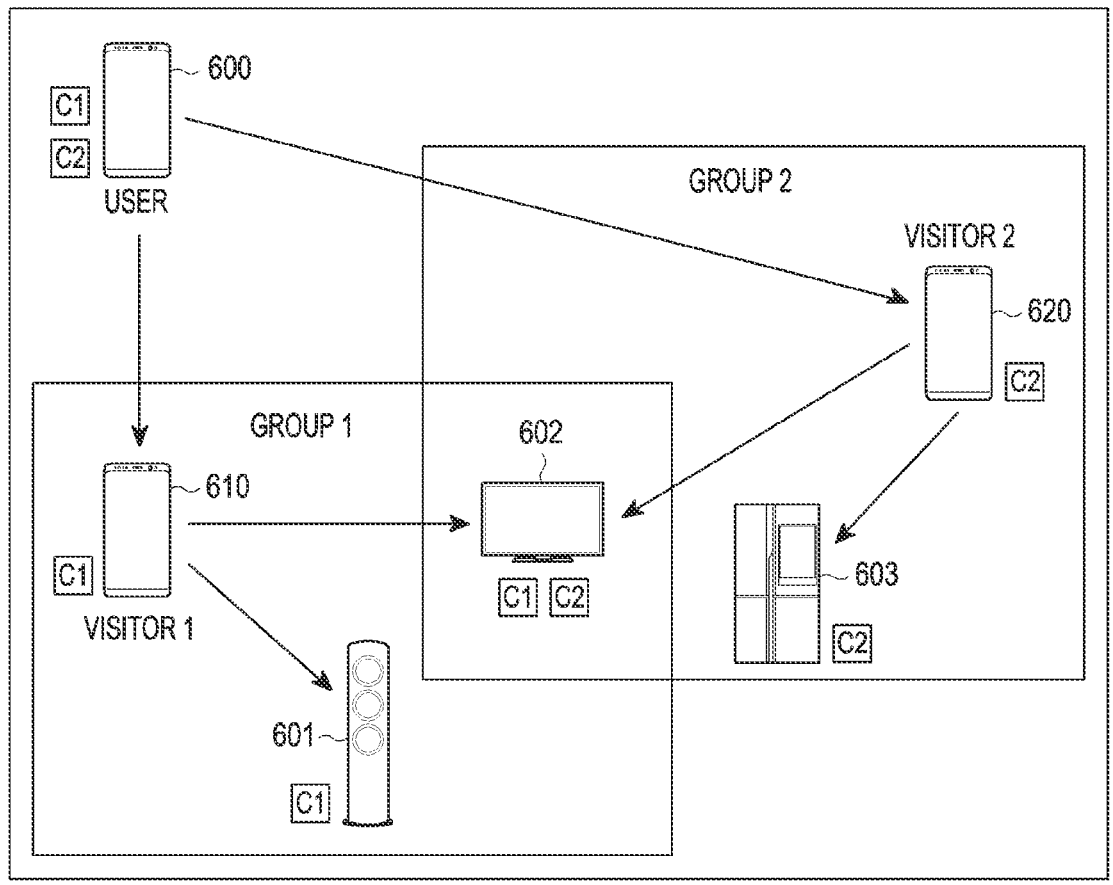
FIG. 6 illustrates an ownership relation when a device control authority is shared between a user terminal and a visitor terminal, according to various embodiments of the present disclosure.

FIG. 6 illustrates an ownership relation when a device control authority is shared between a user terminal 600 and visitor terminals 610 and 620, according to various embodiments of the present disclosure.

Referring to FIG. 6, the user terminal 600 may own an airconditioner 601, a TV 602, and a refrigerator 603 controllable through a communication network, thereby obtaining a control authority over the plurality of devices. The user terminal 600 may be a user set with an ownership for the plurality of devices through an OBT and being qualified as an owner, and may set ownerships for other users to control the plurality of devices. The visitor terminals 610 and 620 that temporarily need the control authority over the plurality of devices may be set with ownerships for the plurality of devices from the user terminal 600 through an MOT method. The first visitor terminal 610 and the second visitor terminal 620 having obtained the ownerships for the devices from the user terminal 600 may be sub owners, and own the control authority identically to the user terminal 600 over devices over which the control authority has obtained, but the range of target devices over which the control authority may be obtained may be limited or ownership setting of another users may not be changed, limiting the authority that may be exercised.

The user terminal 600 may determine at least one device capable of sharing a control authority with the visitor terminal among the plurality of devices 601, 602, and 603 owned by the user terminal 600. The at least one device may be manually selected by the user terminal 600 or may be automatically selected according to a security level or a position of each device. The at least one device may be differently designated for each visitor terminal. For example, the user terminal 600 may set the first visitor terminal 610 to share the control authority over the airconditioner 601 and the TV 602 and the second visitor terminal 620 to share the control authority over the TV 602 and the refrigerator 603.

The user terminal 600 set ownership states of at least one device designated for each visitor terminal to the control authority sharing possible state, generate a shared key to be used for authentication of each visitor terminal, and transmit the shared key to the at least one device. For example, the user terminal 600 may generate the first shared key for authentication of the first visitor terminal 610 and transmit the first shared key to the airconditioner 601 and the TV 602 that are set to the control authority sharing state for the first visitor terminal 610. The user terminal 600 may transmit a second shared key for authentication of the second visitor terminal 620 to the TV 602 and the refrigerator 603 that are set to the control authority sharing state for the second visitor terminal 620.

The user terminal 600 may transmit invitation information including at least one of the control list for the plurality of devices or the first shared key for authentication of the first visitor terminal 610, and receive credential information C1 generated based on the invitation information from the first visitor terminal 610. The user terminal 600 may transmit invitation information including at least one of the control list for the plurality of devices or the second shared key for authentication of the second visitor terminal 620, and receive credential information C2 generated based on the invitation information from the second visitor terminal 620. When transmitting the invitation information, the user terminal 600 may transmit information about at least one of the first visitor terminal 610 or the second visitor terminal 620 for which control authority sharing is permitted, instead of a control list for the plurality of devices. The credential information for the visitor terminals may be generated by using at least one of identification information of each visitor terminal, information about at least one target device over which each visitor terminal is to obtain the control authority, or the shared key or the authentication certificate of each visitor terminal. For example, the first visitor terminal 610 may generate the credential information C1 by using at least one of the identification information, the target device (e.g., the air-conditioner 601 or the TV 602) over which the control authority is to be obtained, the first shared key, or the authentication certificate. The second visitor terminal 620 may generate the credential information C2 by using at least one of the identification information, the target device (e.g., the TV 602 or the refrigerator 603) over which the control authority is to be obtained, the second shared key, or the authentication certificate.

Upon completion of authentication between the user terminal 600 and the first visitor terminal 610 or the second visitor terminal 620, the user terminal 600 may deliver credential information received from each visitor terminal to the target device. For example, the user terminal 600 may transmit the credential information C1 of the first visitor terminal 610 to the air-conditioner 601 and the TV 602 that are the target devices over which the control authority is to be shared with the first visitor terminal 610, and transmit the credential information C2 of the second visitor terminal 620 to the TV 602 and the refrigerator 603 that are target devices over which the control authority is to be shared with the second visitor terminal 620. In FIG. 6, the TV 602 having received both the credential information C1 and the credential information C2 may be set with an ownership by all of the user terminal 600, the first visitor terminal 610, and the second visitor terminal 620, and a control authority over the TV 602 may be owned by all of the user terminal 600, the first visitor terminal 610, and the second visitor terminal 620. The control authority of the user terminal 600 may be maintained without a special limitation, but the control authority of the first visitor terminal 610 or the second visitor terminal 620 may be limitedly maintained during a valid time of the credential information C1 or C2. When the valid time of the credential information has elapsed or a situation is detected in which the visitor terminal does not require a control authority over the devices any longer, the user terminal 600 may discard the credential information C1 or C2 and notify the devices of discard of the credential information C1 or C2, thereby withdrawing the control authority of the first visitor terminal 610 or the second visitor terminal 620.

According to various embodiments of the present disclosure, the user terminal 600 may manage the TV 602 and the refrigerator 603 sharing the control authority with the first visitor terminal 602 as the first group and the TV 602 and the refrigerator 603 sharing the control authority with the second visitor terminal 620 as a second group. The user terminal 600 may add or exclude a device managed by each group to correspond to situation information change related to each group (e.g., reception of a request from the visitor terminal, movement of the visitor terminal, position change of the target device, or detection of the enabled/disabled state of the target device), and change control authority setting of each visitor terminal.

According to various embodiments of the present disclosure, to safely and collectively transmit information about a plurality of devices owned by the user terminal 600 having a master authority in a first space to the first visitor terminal 610, the user terminal 600 may temporarily own the first visitor terminal 610. The user terminal 600 may generate a group A including at least one of the air-conditioner 601, the TV 602, or the refrigerator 603 and temporarily leave the first space. The user terminal 600 may exchange information for authentication of the first visitor terminal 610 with the first visitor terminal 610, and the first visitor terminal 610 may enter the first space and generate a group B including at least one of the air-conditioner 601, the TV 602, or the refrigerator 603 without intervention of the user terminal 600. The information for authentication of the first visitor terminal 610 may be information exchanged between the user terminal 600 and the first visitor terminal 610 when authentication with respect to the first visitor terminal 610 is performed, and may include invitation information including at least one of a control list for the plurality of devices or the shared key configured by the user terminal and credential information generated by the first visitor terminal 610 based on the invitation information. Information exchange for authentication between the user terminal 600 and the first visitor terminal 610 may be performed using an out-of-band scheme. After the first visitor terminal 610 generates the group B, the user terminal 600 may enter the first space again and add the group B of the first visitor terminal 610 to the group A, thereby owning the first visitor terminal 610. Such an ownership relation may be released in a manner that the user terminal 600 removes the group B from the group A.

Figure 7:
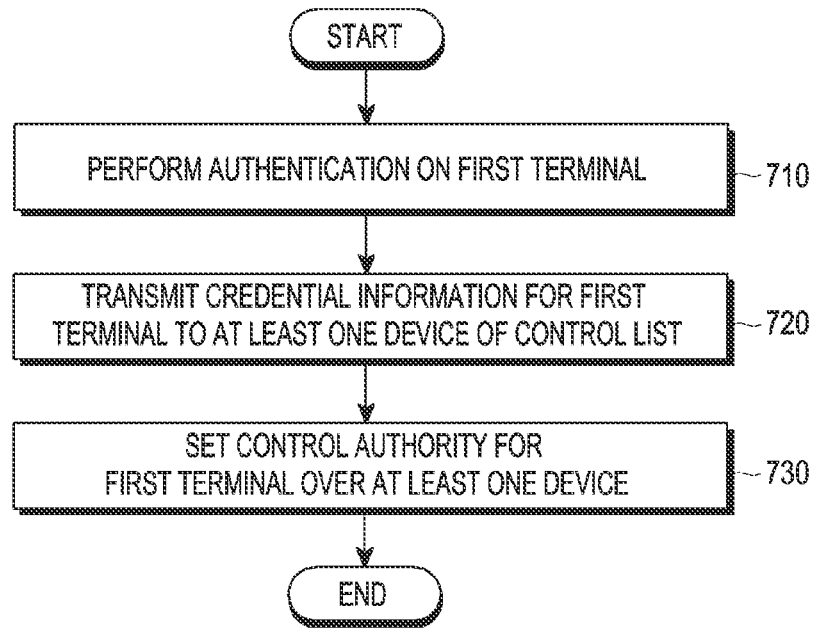
FIG. 7 is a flowchart of a method for providing a device control service by an electronic device that manages a control authority over a plurality of devices, according to various embodiments of the present disclosure.

FIG. 7 is a flowchart of a method for providing a device control service by the electronic device 201 that manages a control authority over a plurality of devices, according to various embodiments of the present disclosure. According to an embodiment, the electronic device 201 may give a control authority over a plurality of devices controllable through a communication network to another user and withdraw a control authority given to another user.

In operation 710, the electronic device 201 may receive a control authority setting request for controlling at least one of the plurality of devices from a first terminal and perform authentication with respect to the first terminal in response to the control authority setting request. To set a control authority of the first terminal with respect to the at least one device, the electronic device 201 may set an ownership state of the at least one device to a control authority owning possible state, generate a first shared key to be used for authentication of the first terminal, and transmit the first shared key to the at least one device. The at least one device for which control authority sharing is permitted among the plurality of devices owned by the electronic device 201 may be previously designated or may be selected by user's setting during authentication with respect to the first terminal.

In operation 710, authentication with respect to the first terminal may be performed by the electronic device 201 inviting the first terminal and receiving the credential information generated by the first terminal in response to the invitation. The invitation may be performed by transmitting the invitation information including at least one of the control list or the first shared key to the first terminal. The first terminal having received the invitation information from the electronic device 201 may generate credential information based on the invitation information.

Upon completion of authentication between the electronic device 201 and the first terminal in operation 710, the electronic device 201 may transmit credential information for the first terminal to at least one device included in the target device list in operation 720. In operation 720, the electronic device 201 may set a valid time for the credential information to cause the first terminal to temporarily obtain the control authority over the at least one device. When the valid time for the credential information has elapsed, the electronic device 201 may withdraw the control authority of the first terminal with respect to the at least one device by notifying the at least one device of discard of the credential information.

In operation 730, the electronic device 201 may set the control authority of the first terminal with respect to the at least one device, based on the credential information. The electronic device 201 may cause the first terminal and the at least one device to communicate with each other by using the credential information, and manage the at least one device over which the first terminal has obtained the control authority as a first group. For example, the electronic device

201 may add or exclude a device managed by the first group to correspond to situation information change related to the first group (e.g., reception of a request from the first terminal, position change of the first terminal or the at least one device, or detection of an enabled/disabled state of the at least one device), and change control authority setting of the first terminal.

According to various embodiments of the present disclosure, the electronic device 201 may determine by using the sensor module for detecting positions of the plurality of devices or at least one of the first terminals whether the first terminal is located within a designated distance from the electronic device 201 or the at least one device. When determining that the first terminal is not within the designated distance, the electronic device 201 may discard the credential information even when the valid time for the credential information of the first terminal has not elapsed, and notify the at least one terminal of discard of the credential information, thereby withdrawing the control authority for the at least one device, obtained by the first terminal.

A method for providing a device control service by the electronic device 201 that manages a control list for a plurality of devices controllable through a communication network, according to various embodiments of the present disclosure includes operation 710 of performing authentication with respect to a first terminal in response to a control authority setting request for controlling at least one of the plurality of devices from the first terminal, operation 720 of transmitting credential information for the first terminal to at least one of the plurality of devices included in the control list, and operation 730 of setting a control authority of the first terminal for the at least one device.

According to various embodiments of the present disclosure, the method further includes setting at least one of the plurality of devices to a control authority sharing possible state and transmitting a first shared key for authentication of the first terminal to the at least one device.

According to various embodiments of the present disclosure, operation 710 of performing authentication with respect to the first terminal includes transmitting invitation information including at least one of the control list or the first shared key for the plurality of devices to the first terminal and receiving the credential information generated based on the invitation information from the first terminal.

According to various embodiments of the present disclosure, the control list includes at least one of item-specific device identification information, device type information, control authority setting information, or security level information of the plurality of devices.

According to various embodiments of the present disclosure, the credential information includes at least one of identification information of the first terminal, a list of devices over which the first terminal is to share a control authority, the first shared key, or an authentication certificate.

According to various embodiments of the present disclosure, operation 710 of performing authentication with respect to the first terminal may be performed using an out-of-band scheme.

According to various embodiments of the present disclosure, the method may further include setting a valid time for the credential information of the first terminal and releasing control authority setting of the first terminal for the at least one device upon elapse of the valid time.

According to various embodiments of the present disclosure, the method may further include discarding the credential information of the first terminal when determining that the first terminal is not within the designated distance by using a sensor module and notifying to the at least one device that the credential information of the first terminal is discarded.

Figure 8:
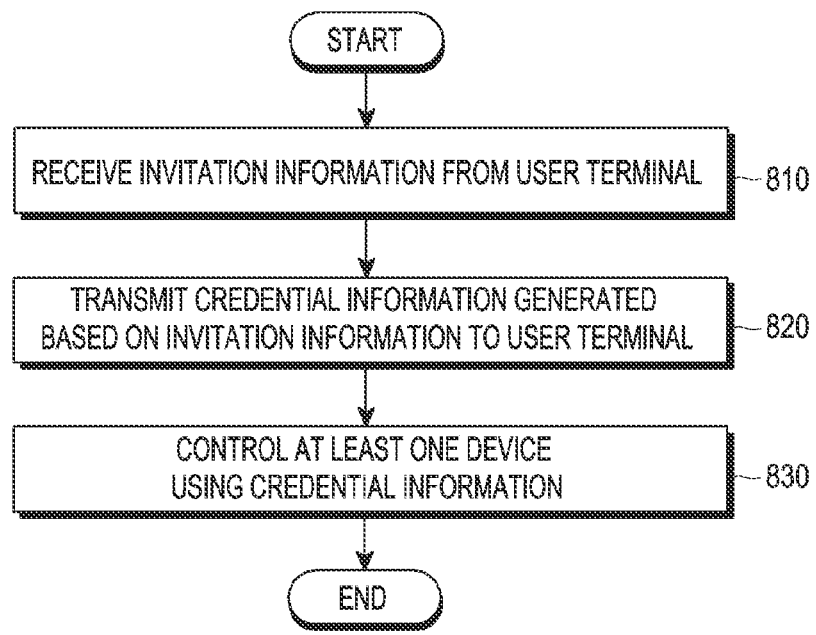
FIG. 8 is a flowchart of a method for providing a device control service by an electronic device that temporarily obtains a control authority over a plurality of devices, according to various embodiments of the present disclosure.

FIG. 8 is a flowchart of a method for providing a device control service by the electronic device 301 that temporarily obtains a control authority for a plurality of devices, according to various embodiments of the present disclosure. According to an embodiment, the electronic device 301 may obtain a control authority for a plurality of devices controllable through a communication network from a user terminal having the control authority.

In operation 810, the electronic device 301 may receive invitation information including at least one of a control list or a first shared key for the plurality of devices from the user terminal, by using the communication module 301. The control list may include, as information about a plurality of devices which the electronic device 201 owns and for which the user terminal has a control authority, at least one of item-specific device identification information, device type information, control authority setting state information, or security level information of the plurality of devices. The user terminal may transmit the invitation information to the electronic device 301 in response to reception of an authentication request for obtaining the control authority for at least one of the plurality of devices from the electronic device 301 or detection of the electronic device 301 within a previously designated distance.

In operation 820, the electronic device 301 may generate credential information for obtaining the control authority for the at least one device based on the invitation information received from the user terminal and transmit the generated credential information to the user terminal. The credential information may be generated by using at least one of identification information of the electronic device 301, information about at least one target device over which the electronic device 301 is to obtain the control authority, the first shared key, or the authentication certificate. The at least one target device may correspond to all or some of at least one device set to the control authority sharing possible state in the control list. According to various embodiments of the present disclosure, the electronic device 301 may identify a device having an ownership state set to the control authority sharing possible state among a plurality of devices included in the control list, and select all or some of the devices set to the control authority sharing possible state, as at least one target device over which the control authority is to be obtained from the user terminal. The electronic device 301 may exchange the invitation information or the credential information with the user terminal by using the out-of-band scheme.

In operation 820, upon completion of authentication for the user terminal, the credential information may be delivered to the at least one target device by the user terminal. When the control authority of the electronic device 301 with respect to the at least one target device is set by the user terminal, the electronic device 301 may control the at least one target device by using the credential information in operation 830. For example, the electronic device 301 may generate a symmetric key for communication with the at least one target device based on the credential information, and control the at least one target device by using the generated symmetric key. The at least one target device may be managed as the first group, and upon occurrence of situation information change (e.g., requesting by the electronic device 301, position change of the electronic device 301 or the at least one device, or detection of an enabled/disabled state of the at least one device), control authority setting of the electronic device 301 may be changed by the user terminal.

According to various embodiments of the present disclosure, when the credential information is deleted by the user terminal or the credential information is discarded due to an elapse of a valid time set in the credential information, the control authority of the electronic device 301 with respect to the at least one device may be deleted, such that the electronic device 301 may not be able to control the at least one device any longer.

Figure 9:
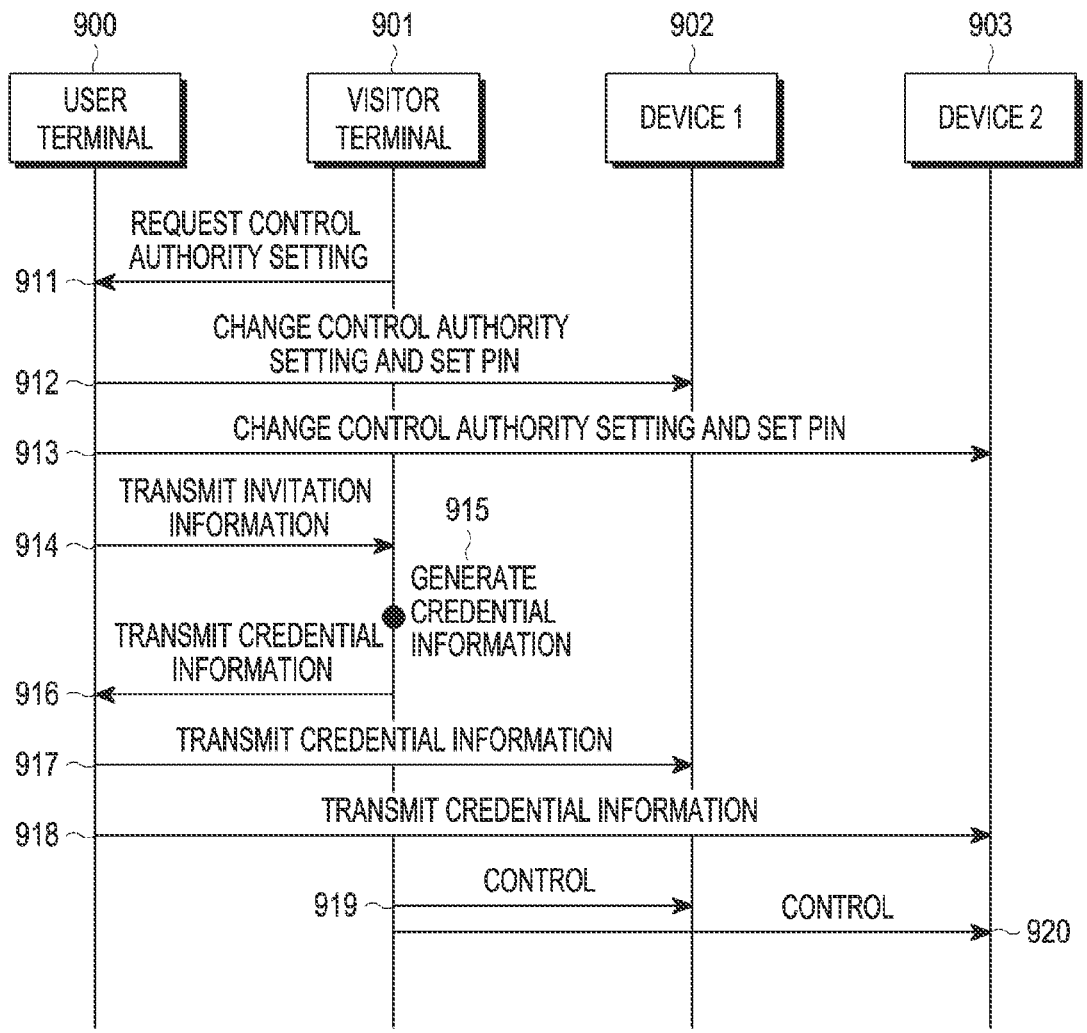
FIG. 9 illustrates a procedure for setting a control authority of a visitor terminal with respect to a plurality of devices, according to various embodiments of the present disclosure.

FIG. 9 illustrates a procedure for setting a control authority of a visitor terminal with respect to a plurality of devices, according to various embodiments of the present disclosure. In FIG. 9, a user terminal 900 may communicate with a visitor terminal 901, a device #1 902, or a device #2 903 through a wireless network. The user terminal 900 may correspond to the first user terminal 110 of FIG. 1 or the electronic device 201 of FIG. 2, and the visitor terminal 901 may correspond to the second user terminal 120 of FIG. 1 or the electronic device 301 of FIG. 3.

Referring to FIG. 9, in operation 911, the visitor terminal 901 may request the user terminal 900 to set the control authority for at least one of the plurality of devices. According to various embodiments of the present disclosure, the user terminal 900 may search for a visitor terminal 901 entering within a designated distance to set the control authority of the visitor terminal 901 for the at least one device, and in this case, operation 911 may be omitted.

In operations 912 and 913, the user terminal 900 may set ownership states of the device #1 902 and the device #2 903 for which control authority sharing is permitted among the plurality of devices to the control authority sharing possible state, and set a PIN to be used for authentication of the visitor terminal 901. Whether sharing of a control authority for each device is possible may be manually set by the user terminal 900 or may be automatically set according to a security level or position of each device.

In operation 914, the user terminal 900 may transmit the invitation information for authentication of the visitor terminal 901. The invitation information may include at least one of a control list for the plurality of devices or the PIN configured by the user terminal 900 for authentication of the visitor terminal 901. The control list may include at least one of device identification information, device type information, control authority setting state information, or security level information of the plurality of devices (the device #1 902 and the device #2 903 for which control authority sharing is permitted among the plurality of devices).

In operation 915, the visitor terminal 901 may generate the credential information based on the invitation information received from the user terminal 900. The credential information may include at least one of identification information of the visitor terminal 901, information about the device #1 or the device #2 over which the visitor terminal 901 is to obtain the control authority, the PIN, or the authentication certificate.

In operation 916, the visitor terminal 901 may transmit the credential information generated in operation 915 to the user terminal 900. Upon completion of authentication with respect to the visitor terminal 901 through information exchange between the user terminal 900 and the visitor terminal 901, the user terminal 900 may transmit the credential information to the device #1 902 and the device #2 903 in operations 917 and 918. When the control authority of the visitor terminal 901 over the device #1 902 and the device #2 903 is set after transmission of the credential information of the visitor terminal 900, the visitor terminal 901 may control the device #1 902 and the device #2 903 by using the credential information in operations 919 and 920.

Figure 10:
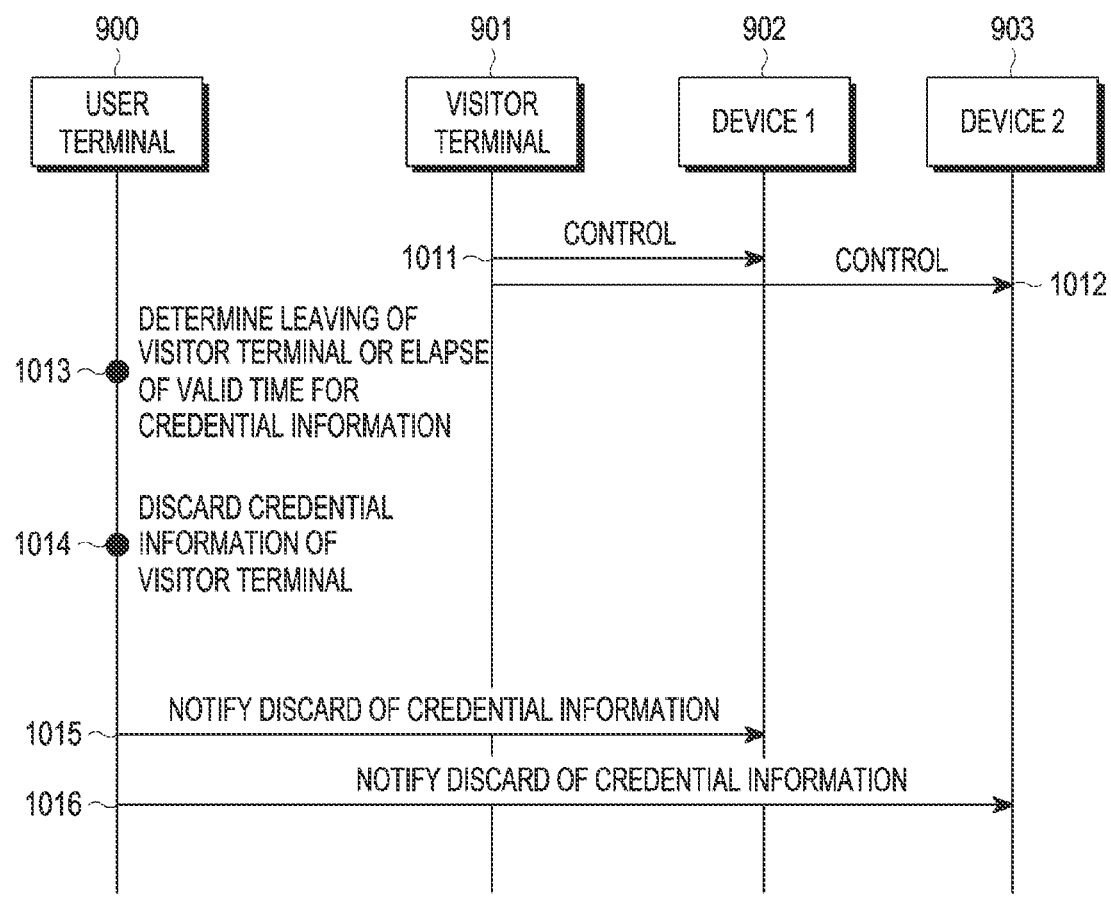
FIG. 10 illustrates a procedure for withdrawing a control authority of a visitor terminal with respect to a plurality of devices, according to various embodiments of the present disclosure.

FIG. 10 illustrates a procedure for withdrawing a control authority of a visitor terminal with respect to a plurality of devices, according to various embodiments of the present disclosure. In FIG. 10, a user terminal 900 may communicate with a visitor terminal 901, a device #1 902, or a device #2 903 through a wireless network. The user terminal 900 may correspond to the first user terminal 110 of FIG. 1 or the electronic device 201 of FIG. 2, and the visitor terminal 901 may correspond to the second user terminal 120 of FIG. 1 or the electronic device 301 of FIG. 3.

Referring to FIG. 10, in operations 1011 and 1012, the visitor terminal 901 may control the device #1 902 and the device #2 903 by using the credential information. According to various embodiments of the present disclosure, a valid time may be set for the credential information of the visitor terminal 901. The user terminal 900 may release control authority setting applied to the visitor terminal 901 upon the elapse of the valid time of the credential information. Even when the valid time of the credential information has not elapsed or when the user terminal 900 detects leaving of the visitor terminal 901 or determines no need to control the device #1 902 and the device #2 903, the user terminal 900 may release the control authority setting.

In operation 1013, the user terminal 900 may determine the elapse of the valid time of the credential information has elapsed or leaving of the visitor terminal 901. When determining that the valid time of the credential information has elapsed, the user terminal 900 may discard the credential information in operation 1014. When determining that the visitor terminal 901 is not within the designated distance due to leaving of the visitor terminal 901 regardless of the elapse of the valid time, the user terminal 900 may discard the credential information.

When the credential information is discarded by the user terminal 900, the user terminal 900 may notify the device #1 902 and the device #2 903 of discard of the credential information in operations 1015 and 1016, after which the visitor terminal 901 may not control the device #1 902 and the device #2 903 any longer.

Figure 11:
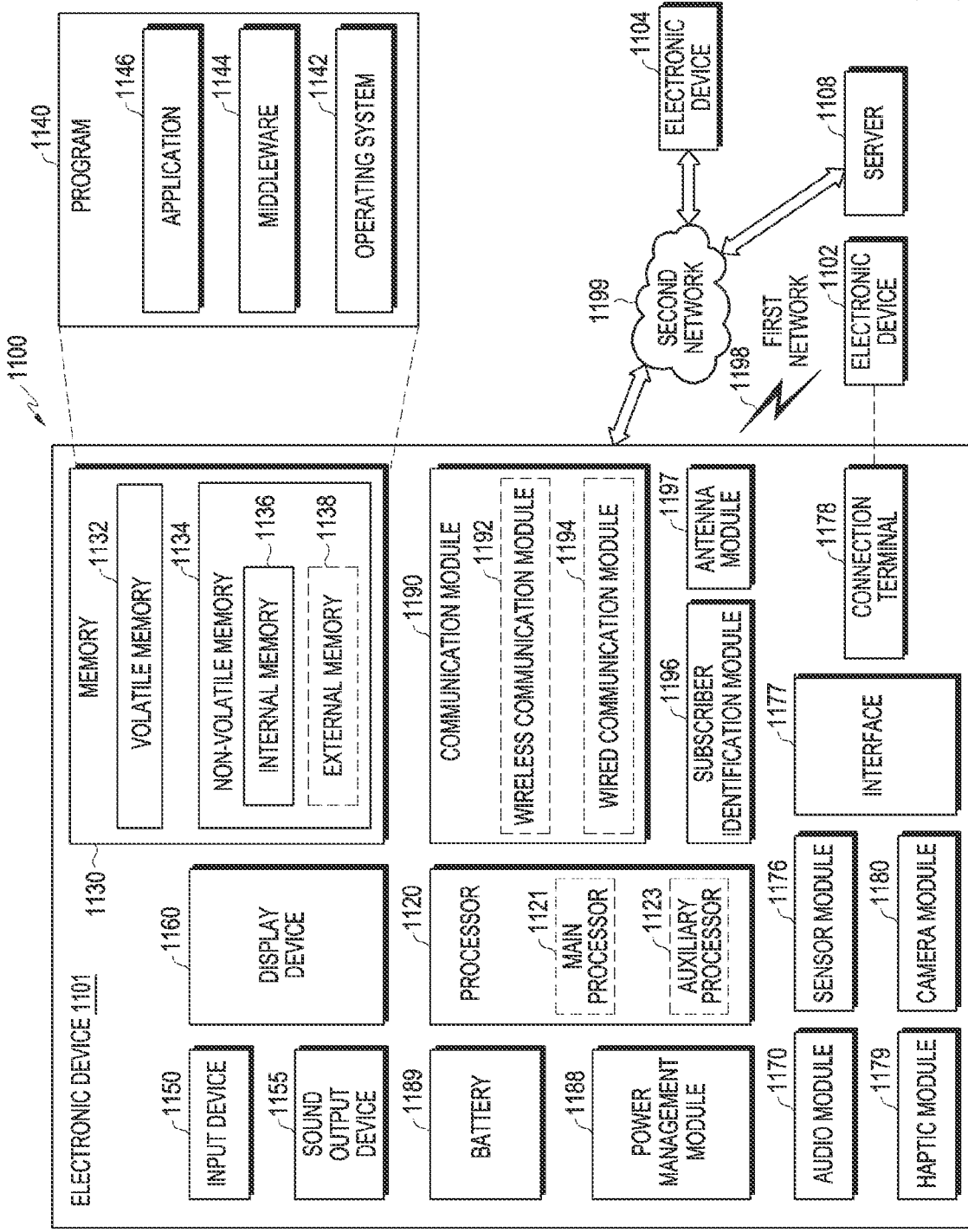
FIG. 11 is a schematic block diagram of an electronic device in a network environment according to various embodiments of the disclosure.

FIG. 11 is a block diagram illustrating an electronic device 1101 in a network environment 1100 according to various embodiments of the present disclosure. Referring to FIG. 1, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as a single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, the hologram device, and the projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or motion) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, Wireless-Fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device). According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 from the plurality of antennas. The signal or the power may then be transmitted or received between the communication module 1190 and the external electronic device via the selected at least one antenna. According to an embodiment of the present disclosure, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic device 1102 and the electronic device 1104 may be a device of the same type as, or a different type, from the electronic device 1101. According to an embodiment, all or some of operations to be executed at the electronic device 1101 may be executed at one or more of the external electronic devices 1102, 1104, or 1108. For example, when the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a storage medium having stored therein instructions, the instructions are configured to cause, when executed by at least one processor 1120, the at least one processor to perform at least one operation including performing authentication with respect to a first terminal in response to a control authority setting request for controlling at least one of the plurality of devices from the first terminal, transmitting credential information for the first terminal to at least one of the plurality of devices included in the control list, and setting a control authority of the first terminal for the at least one device.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
communication circuitry;
a processor; and
a memory operatively connected with the processor and storing a control list of a plurality of devices controllable through a communication network,
wherein the memory stores an open connectivity foundation (OCF) standards-based application programming interface (API) and instructions that are configured, when executed, to cause the processor to:
receive, through a multiple ownership transfer (MOT) agent operating on the OCF standards-based API, a control authority setting request from a first terminal for controlling at least one of the plurality of devices;
perform authentication with respect to the first terminal in response to the control authority setting request;
transmit credential information for the first terminal to the at least one of the plurality of devices included in the control list;
transmit a first shared key for authentication of the first terminal to the at least one of the plurality of devices;
set a control authority of the first terminal for the at least one of the plurality of devices;
in response to determining that there is no need to control the at least one of the plurality of devices, discard the credential information of the first terminal by using the MOT agent operating on the OCF standards-based API; and
notify the at least one of the plurality of devices that the credential information of the first terminal is discarded,
wherein the control list comprises item-specific device identification information, device type information, control authority setting information, and security level information of the plurality of devices, and
wherein the credential information comprises identification information of the first terminal, a list of device over which the first terminal is to share a control authority, the first shared key, and an authentication certificate.

2. The electronic device of claim 1, wherein the instructions are configured to cause the processor to:
set at least one of the plurality of devices included in the control list to a control authority sharing possible state.

3. The electronic device of claim 2, wherein the instructions are configured to cause the processor to:
transmit invitation information comprising at least one of the control list or the first shared key to the first terminal, by using the communication circuitry; and
receive the credential information generated based on the invitation information from the first terminal, by using the communication circuitry.

4. The electronic device of claim 1, wherein the instructions are configured to cause the processor to perform authentication with respect to the first terminal by using an out-of-band scheme.

5. A method for providing a device control service by an electronic device that manages a control list for a plurality of devices controllable through a communication network, the method comprising:
receiving, through a multiple ownership transfer (MOT) agent operating on an open connectivity foundation (OCF) standards-based application programming interface (API), a control authority setting request from a first terminal for controlling at least one of the plurality of devices;

performing authentication with respect to the first terminal in response to the control authority setting request;

transmitting credential information for the first terminal to the at least one of the plurality of devices included in the control list;

transmitting a first shared key for authentication of the first terminal to the at least one of the plurality of devices;

setting a control authority of the first terminal for the at least one of the plurality of devices;

in response to determining that there is no need to control the at least one of the plurality of devices, discarding the credential information of the first terminal by using MOT agent operating on the OCF standards-based API; and notifying the at least one of the plurality of devices that the credential information of the first terminal is discarded, wherein the control list comprises item-specific device identification information, device type information, control authority setting information, and security level information of the plurality of devices, and wherein the credential information comprises identification information of the first terminal, a list of devices over which the first terminal is to share a control authority, the first shared key, and an authenticate certificate.

6. The method of claim 5, further comprising:

setting at least one of the plurality of devices to a control authority sharing possible state.

7. The method of claim 6, wherein the performing of authentication with respect to the first terminal comprises:

transmitting invitation information comprising at least one of the control list or the first shared key to the first terminal; and receiving the credential information generated based on the invitation information from the first terminal.

* * * * *